United States Patent
Andujar

(10) Patent No.: US 11,640,773 B1
(45) Date of Patent: May 2, 2023

(54) ROTATING REFLECTIVE SIGN FOR USE WITH A DISABLED VEHICLE

(71) Applicant: Cesar A. Andujar, Metairie, LA (US)

(72) Inventor: Cesar A. Andujar, Metairie, LA (US)

( * ) Notice: Subject to any disclaimer, the term of this patent is extended or adjusted under 35 U.S.C. 154(b) by 0 days.

(21) Appl. No.: 17/879,964

(22) Filed: Aug. 3, 2022

(51) Int. Cl.
| | | |
|---|---|---|
| *G09F 13/16* | (2006.01) | |
| *G09F 7/22* | (2006.01) | |
| *E01F 9/662* | (2016.01) | |
| *B60Q 7/00* | (2006.01) | |
| *E01F 9/619* | (2016.01) | |
| *G09F 7/18* | (2006.01) | |

(52) U.S. Cl.
CPC ........... *G09F 13/165* (2013.01); *B60Q 7/005* (2013.01); *E01F 9/619* (2016.02); *E01F 9/662* (2016.02); *G09F 7/22* (2013.01); *G09F 2007/1865* (2013.01)

(58) Field of Classification Search
CPC .. G09F 13/165; G09F 7/22; G09F 2007/1865; E01F 9/619; E01F 9/662; B60Q 7/005
See application file for complete search history.

(56) References Cited

U.S. PATENT DOCUMENTS

| | | | |
|---|---|---|---|
| 2,781,017 A * | 2/1957 | Fuller | B60Q 7/005 116/63 R |
| 3,292,569 A | 12/1966 | Trigilio | |
| 3,703,152 A | 11/1972 | Morton | |
| 3,762,360 A | 10/1973 | Hawes | |
| 4,325,318 A | 4/1982 | Kitrell | |
| 5,048,451 A | 9/1991 | Reimers | |
| D373,601 S | 9/1996 | Jackle | |
| 5,953,841 A * | 9/1999 | Sawyer | G09F 15/0087 40/484 |
| 6,178,676 B1 | 1/2001 | Lund | |
| 6,276,080 B1 | 8/2001 | Brennan | |
| 9,395,217 B1 * | 7/2016 | Gaor | G09F 17/00 |
| 10,311,763 B2 * | 6/2019 | Greenfield | G09F 13/16 |
| 11,072,279 B1 * | 7/2021 | Bates | B60Q 1/52 |
| 2003/0029066 A1 * | 2/2003 | Venn | G09F 15/0056 40/493 |
| 2004/0060214 A1 * | 4/2004 | Hanley | G09F 15/0087 40/479 |
| 2008/0236009 A1 * | 10/2008 | Venn | G09F 7/22 40/606.12 |

(Continued)

FOREIGN PATENT DOCUMENTS

WO     1990006865     6/1990

*Primary Examiner* — Gary C Hoge
(74) *Attorney, Agent, or Firm* — Kyle A. Fletcher, Esq.

(57) ABSTRACT

The rotating reflective sign for use with a disabled vehicle comprises a mounting base, a telescoping armature, a sign, and an information pouch. The rotating reflective sign for use with a disabled vehicle may be removably coupled to a vehicle and may be adapted to alert oncoming motorists that the vehicle is disabled and/or unattended. The mounting base may couple to a top surface of the vehicle. The telescoping armature may extend upwards from the mounting base and may support the sign above the vehicle. The sign may rotate when actuated by wind. The sign may comprise a plurality of vanes that may reflect light and may thereby increase the visibility of the sign. The information pouch may be adapted to provide information regarding an owner of the vehicle.

20 Claims, 4 Drawing Sheets

(56) References Cited

U.S. PATENT DOCUMENTS

2015/0128463 A1\* 5/2015 Evans ................ G09F 19/12
 40/412
2018/0130387 A1\* 5/2018 Greenfield ............ B63B 22/16

\* cited by examiner

ROTATING REFLECTIVE SIGN FOR USE WITH A DISABLED VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of vehicle accessories and signaling devices, more specifically, a rotating reflective sign for use with a disabled vehicle.

SUMMARY OF INVENTION

The rotating reflective sign for use with a disabled vehicle comprises a mounting base, a telescoping armature, a sign, and an information pouch. The rotating reflective sign for use with a disabled vehicle may be removably coupled to a vehicle and may be adapted to alert oncoming motorists that the vehicle is disabled and/or unattended. The mounting base may couple to a top surface of the vehicle. The telescoping armature may extend upwards from the mounting base and may support the sign above the vehicle. The sign may rotate when actuated by wind. The sign may comprise a plurality of vanes that may reflect light and may thereby increase the visibility of the sign. The information pouch may be adapted to provide information regarding an owner of the vehicle.

An object of the invention is to provide a sign to warn oncoming traffic of a potential hazard due to a disabled vehicle.

Another object of the invention is to couple the sign to the top of the disabled vehicle.

A further object of the invention is to provide a plurality of vanes that are reflective and curved such wind may cause the sign to rotate.

Yet another object of the invention is to provide a telescoping armature to support the sign above the disabled vehicle.

These together with additional objects, features and advantages of the rotating reflective sign for use with a disabled vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the rotating reflective sign for use with a disabled vehicle in detail, it is to be understood that the rotating reflective sign for use with a disabled vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rotating reflective sign for use with a disabled vehicle.

It is therefore important that the claims be regarded as including such equivalent construction insofar as they do not depart from the spirit and scope of the rotating reflective sign for use with a disabled vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
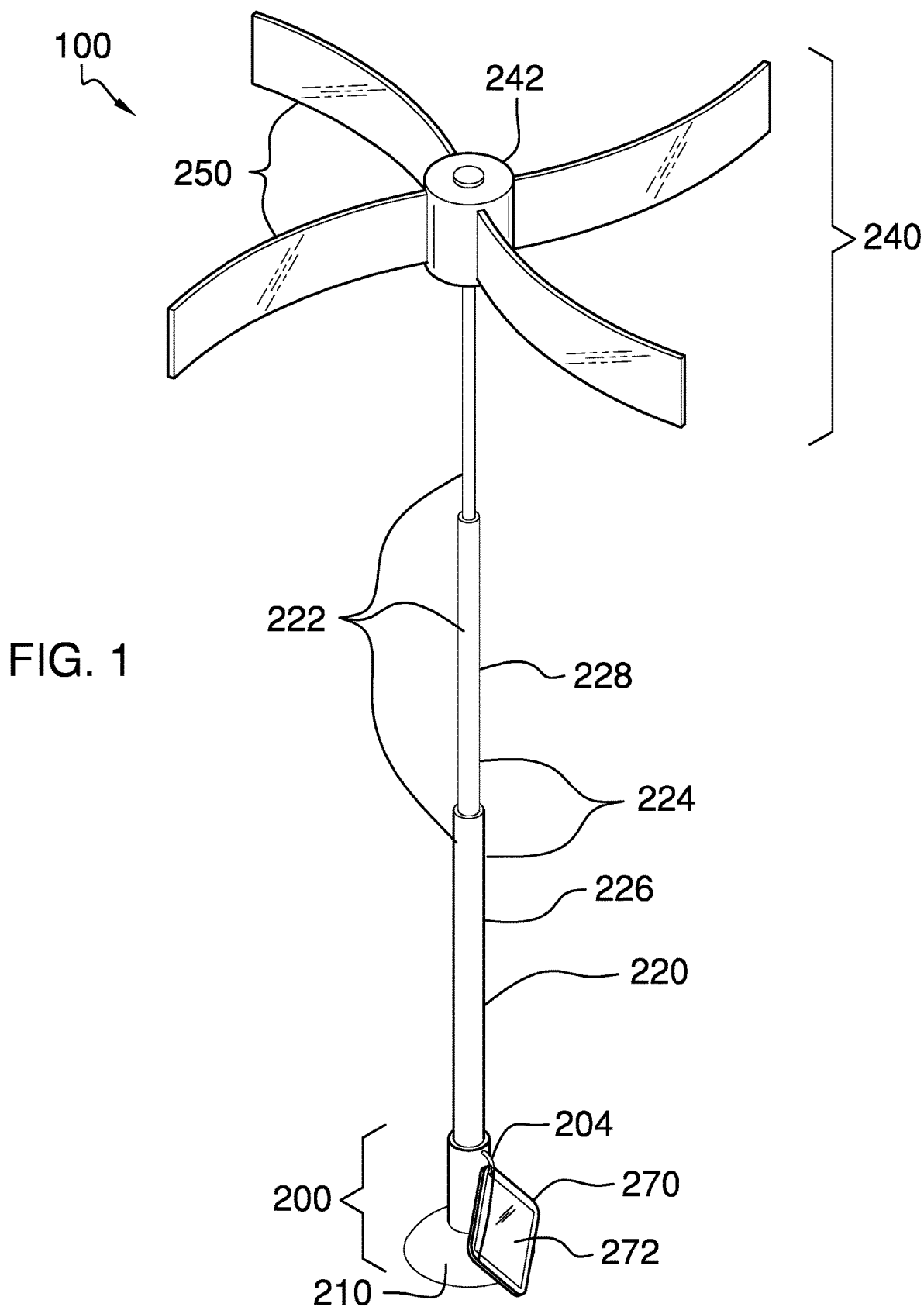
FIG. 1 is an isometric view of an embodiment of the disclosure.
Figure 2:
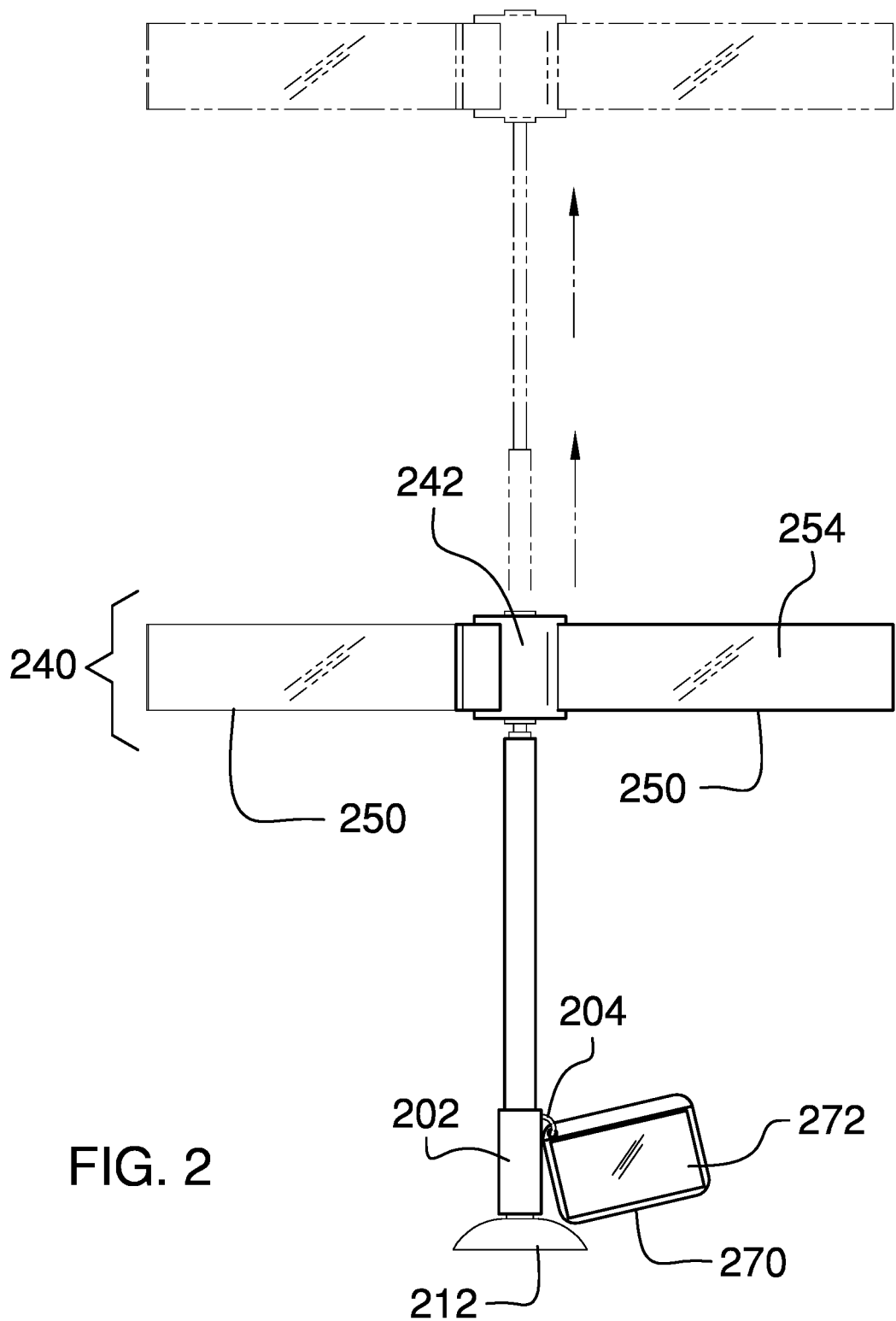
FIG. 2 is a side view of an embodiment of the disclosure.
Figure 3:
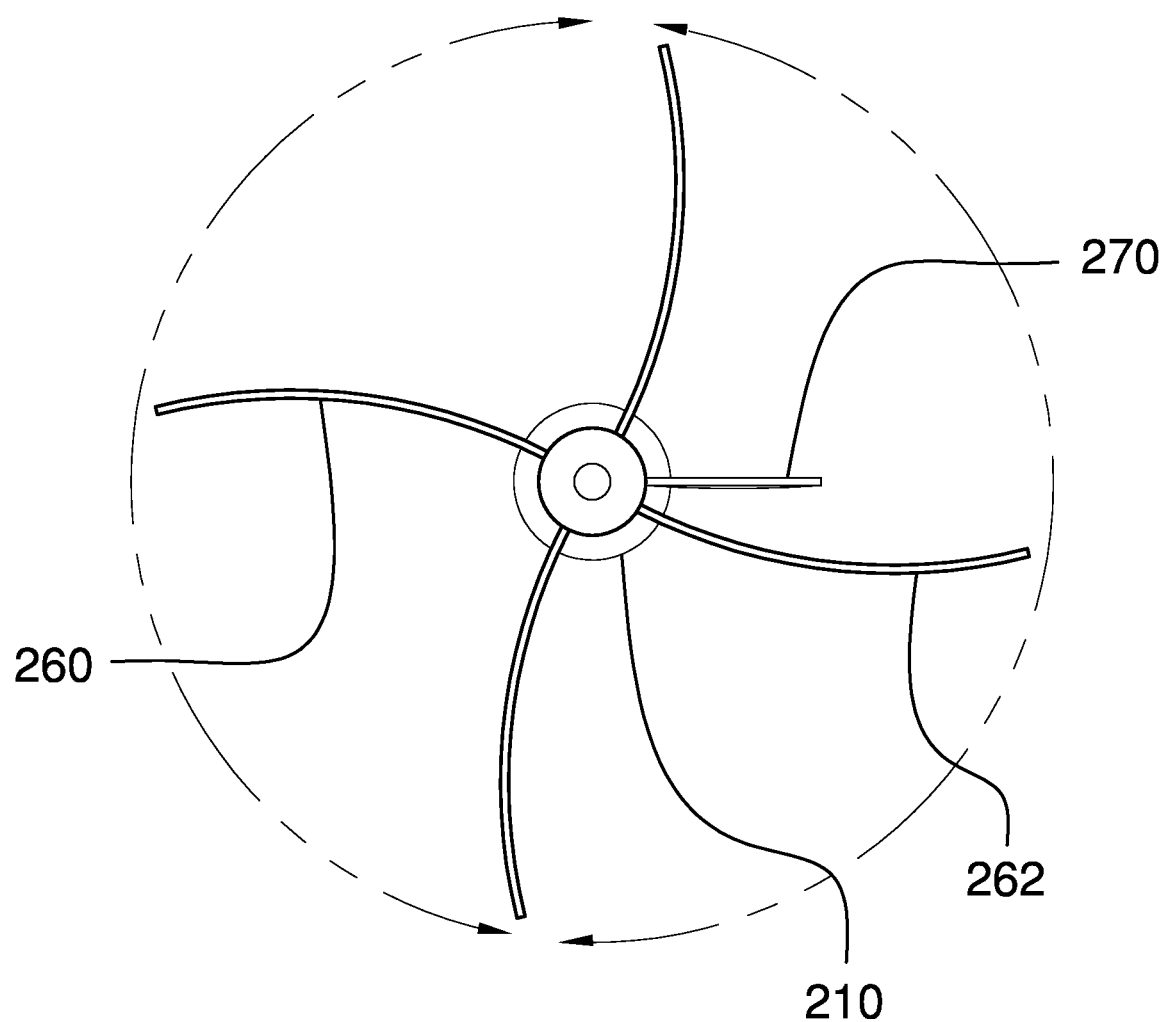
FIG. 3 is a top view of an embodiment of the disclosure.
Figure 4:
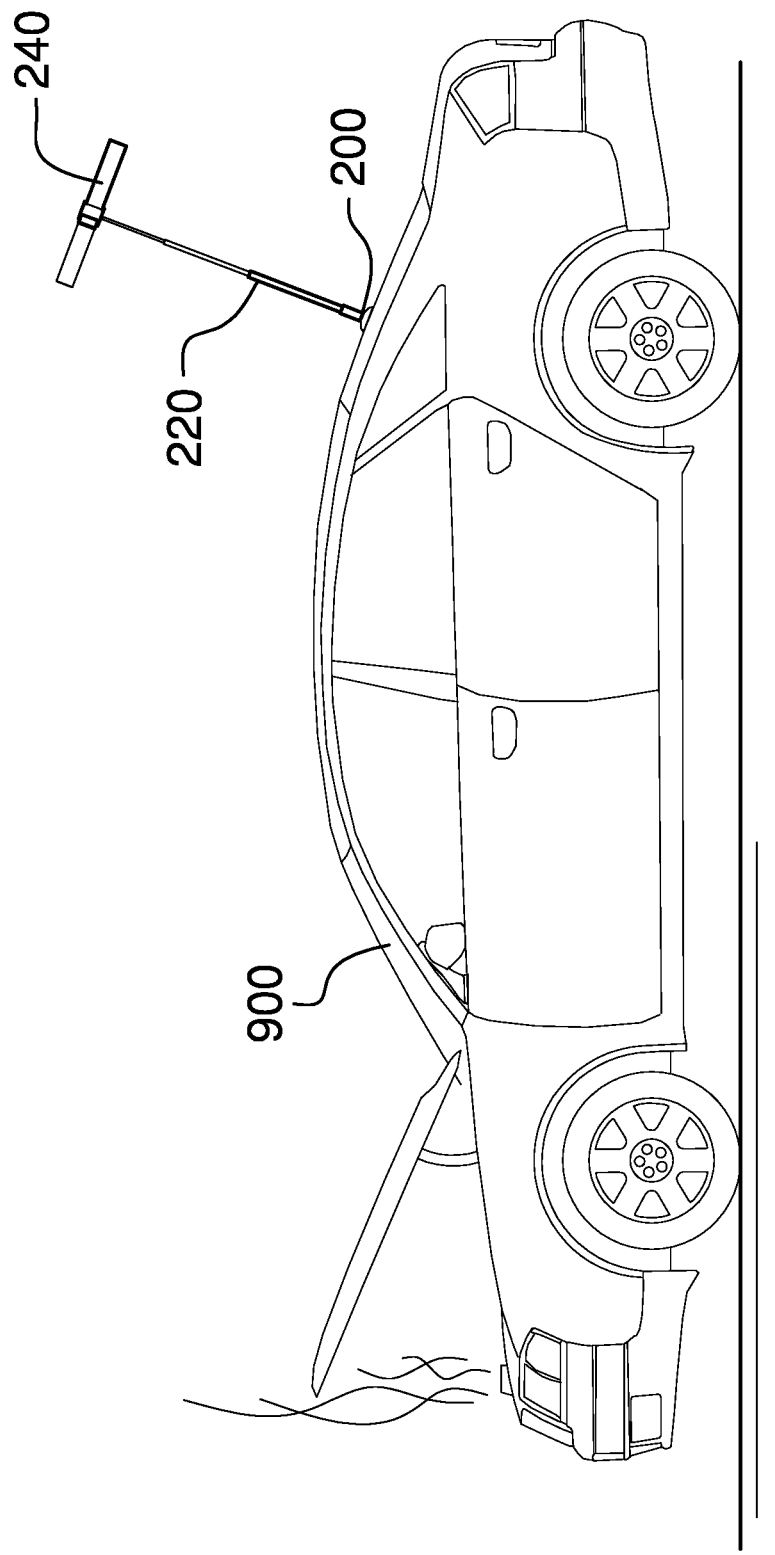
FIG. 4 is an in-use view of an embodiment of the disclosure.

Detailed reference will now be made to a first potential embodiment of the disclosure, which is illustrated in FIGS. 1 through 4.

The rotating reflective sign for use with a disabled vehicle 100 (hereinafter invention) comprises a mounting base 200, a telescoping armature 220, a sign 240, and an information pouch 270. The invention 100 may be removably coupled to a vehicle 900 and may be adapted to alert oncoming motorists that the vehicle 900 is disabled and/or unattended. The mounting base 200 may couple to a top surface of the vehicle 900. The telescoping armature 220 may extend upwards from the mounting base 200 and may support the sign 240 above the vehicle 900. The sign 240 may rotate when actuated by wind. The sign 240 may comprise a plurality of vanes 250 that may reflect light and may thereby increase the visibility of the sign 240. The information pouch 270 may be adapted to provide information regarding an owner of the vehicle 900.

The mounting base 200 may comprise a collar 202 and a vehicle attachment 210. The mounting base 200 may be configured to couple to the vehicle 900 and to support the telescoping armature 220. The vehicle attachment 210 may be coupled to the bottom of the collar 202. As a non-limiting example, the vehicle attachment 210 may be a suction cup 212. The collar 202 may comprise a pouch attachment 204 to retain the information pouch 270 to the mounting base 200.

The telescoping armature 220 may be a telescoping shaft. The bottom of the telescoping armature 220 may detachably couple to the collar 202. The top of the telescoping armature 220 may detachably couple to a hub 242 of the sign 240. The telescoping armature 220 may comprise a plurality of telescoping sections 222 and may extend and collapse as the plurality of telescoping sections 222 are repositioned by sliding. As a non-limiting example, for two adjacent sections 224 selected from the plurality of telescoping sections 222 a smaller section 228 may slide within a larger section 226 when a force is applied such that the telescoping armature 220 may collapse when the smaller section 228 slides into the larger section 226 and may extend when the smaller section 228 slides out of the larger section 226. Friction between the two adjacent sections 224 may retain the telescoping armature 220 at a length once the force is removed.

The sign 240 may be operable to rotate when actuated by the wind in order to draw attention to the vehicle 900. The sign 240 may comprise the hub 242 and the plurality of vanes 250. The plurality of vanes 250 may be coupled to the hub 242. The plurality of vanes 250 may be organized to lie within a horizontally-oriented plane. The plurality of vanes 250 may be equally spaced around the periphery of the hub 242. The hub 242 may be operable to rotate around the top of the telescoping armature 220.

The plurality of vanes 250 may be curved in the same direction. As a non-limiting example, the plurality of vanes 250 may curve in a counter-clockwise direction as the plurality of vanes 250 project away from the hub 242. The curvature of the plurality of vanes 250 may therefore present a concave surface 262 on one side of the hub 242 and a convex surface 260 on the opposite side of the hub 242. In the presence of the wind, the convex surface 260 may deflect the wind and the concave surface 262 may catch the wind, thus causing the plurality of vanes 250 to rotate the hub 242.

The plurality of vanes 250 may be reflective 254 on at least one side of the plurality of vanes 250 such that the plurality of vanes 250 may reflect headlights of approaching vehicles. In some embodiments, the plurality of vanes 250 may comprise polished metal. In some embodiments, the plurality of vanes 250 may comprise a retroreflective sheet applied to the plurality of vanes 250.

In a preferred embodiment, there may be four vanes.

The information pouch 270 may be a clear plastic container for an information card 272. The information pouch 270 may be waterproof such that the information card 272 is protected from the weather. The information pouch 270 may couple to the collar 202 of the mounting base 200 via the pouch attachment 204.

The information card 272 may be adapted to display information regarding the owner of the vehicle 900. As non-limiting examples, the information card 272 may display a name, an address, a phone number, or any combination thereof.

In use, the invention 100 may be placed on top of a vehicle 900 that has become disabled in order to alert oncoming motorists to a potential hazard. The mounting base 200 may be placed on the vehicle 900 to hold the invention 100 in place. As non-limiting examples, the suction cup 212 on the bottom of the mounting base 200 may be applied to a roof, a trunk lid, a hood, or even a rear window of the vehicle 900. The sign 240 may be placed on top of the telescoping armature 220 and the telescoping armature 220 may be extended to raise the sign 240. The plurality of vanes 250 may reflect the headlights of approaching vehicles. The plurality of vanes 250 may catch the wind to cause the sign 240 to spin, thus altering the appearance of the sign 240 on a periodic basis.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "concave" may be used to describe a surface that resembles the interior surface of a sphere or a portion thereof.

As used in this disclosure, "convex" may be used to describe a surface that resembles the exterior surface of a sphere or a portion thereof.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "retroreflective" may refer to a property of an object that reflects light back to the light source with minimal scattering. A retroreflective device may be referred to as a "retroreflector". A retroreflector may reflect light back to the light source over a wide range of angle of incidence.

As used in this disclosure, a "suction cup" may refer to an object or device that uses negative fluid pressure of air or water to adhere to non-porous surfaces by creating a partial vacuum.

As used in this disclosure, "telescopic", "telescoping", and "telescopically" may refer to an object made of two or more sections that fit or slide into each other such that the object can be made longer or shorter by adjusting the relative positions of the sections.

As used in this disclosure, "transparent" may refer to a material that allows light to pass through the material without significant scattering such that an object can be seen without distortion through the material. "Clear" may be considered to be both transparent and colorless.

As used herein, the word "waterproof" may refer to an object that is not harmed when being exposed to water, including total submersion for a period of time. When used as a verb, "waterproof" may refer to taking steps to make an object waterproof. Non-limiting examples of such steps may include applying special coatings or using gaskets to seal seams and entry points of an enclosure.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A rotating reflective sign for use with a disabled vehicle comprising:
   a mounting base, a telescoping armature, a sign, and an information pouch;
   wherein the rotating reflective sign for use with a disabled vehicle is removably coupled to a vehicle and is adapted to alert oncoming motorists that the vehicle is disabled and/or unattended;
   wherein the mounting base couples to a top surface of the vehicle;
   wherein the telescoping armature extends upwards from the mounting base and supports the sign above the vehicle;
   wherein the sign rotates when actuated by wind;
   wherein the sign comprises a plurality of vanes that reflect lights and increase the visibility of the sign;
   wherein the information pouch is adapted to provide information regarding an owner of the vehicle.

2. The rotating reflective sign for use with a disabled vehicle according to claim 1
   wherein the mounting base comprises a collar and a vehicle attachment;
   wherein the mounting base is configured to couple to the vehicle and to support the telescoping armature;
   wherein the vehicle attachment is coupled to the bottom of the collar.

3. The rotating reflective sign for use with a disabled vehicle according to claim 2
   wherein the vehicle attachment is a suction cup.

4. The rotating reflective sign for use with a disabled vehicle according to claim 2
   wherein the collar comprises a pouch attachment to retain the information pouch to the mounting base.

5. The rotating reflective sign for use with a disabled vehicle according to claim 4
   wherein the telescoping armature is a telescoping shaft;
   wherein the bottom of the telescoping armature detachably couples to the collar;
   wherein the top of the telescoping armature detachably couples to a hub of the sign.

6. The rotating reflective sign for use with a disabled vehicle according to claim 5
   wherein the telescoping armature comprises a plurality of telescoping sections and extends and collapses as the plurality of telescoping sections are repositioned by sliding.

7. The rotating reflective sign for use with a disabled vehicle according to claim 6
   wherein for two adjacent sections selected from the plurality of telescoping sections a smaller section slides within a larger section when a force is applied such that the telescoping armature collapses when the smaller section slides into the larger section and extends when the smaller section slides out of the larger section.

8. The rotating reflective sign for use with a disabled vehicle according to claim 7
   wherein friction between the two adjacent sections retains the telescoping armature at a length once the force is removed.

9. The rotating reflective sign for use with a disabled vehicle according to claim 8
   wherein the sign is operable to rotate when actuated by the wind in order to draw attention to the vehicle.

10. The rotating reflective sign for use with a disabled vehicle according to claim 9
    wherein the sign comprises the hub and the plurality of vanes;
    wherein the plurality of vanes are coupled to the hub;
    wherein the plurality of vanes are organized to lie within a horizontally-oriented plane;
    wherein the plurality of vanes are equally spaced around the periphery of the hub;
    wherein the hub is operable to rotate around the top of the telescoping armature.

11. The rotating reflective sign for use with a disabled vehicle according to claim 10
    wherein the plurality of vanes are curved in the same direction.

12. The rotating reflective sign for use with a disabled vehicle according to claim 11
    wherein the plurality of vanes curve in a counter-clockwise direction as the plurality of vanes project away from the hub.

13. The rotating reflective sign for use with a disabled vehicle according to claim 11
    wherein the curvature of the plurality of vanes presents a concave surface on one side of the hub and a convex surface on the opposite side of the hub;
    wherein in the presence of the wind, the convex surface deflects the wind and the concave surface catches the wind, thus causing the plurality of vanes to rotate the hub.

14. The rotating reflective sign for use with a disabled vehicle according to claim 13
    wherein the plurality of vanes are reflective on at least one side of the plurality of vanes such that the plurality of vanes reflect headlights of approaching vehicles.

15. The rotating reflective sign for use with a disabled vehicle according to claim 14
    wherein the plurality of vanes comprise polished metal.

16. The rotating reflective sign for use with a disabled vehicle according to claim 14
    wherein the plurality of vanes comprise a retroreflective sheet applied to the plurality of vanes.

17. The rotating reflective sign for use with a disabled vehicle according to claim 14
    wherein there are four vanes.

18. The rotating reflective sign for use with a disabled vehicle according to claim 14
    wherein the information pouch is a clear plastic container for an information card;
    wherein the information pouch is waterproof such that the information card is protected from the weather;

wherein the information pouch couples to the collar of the mounting base via the pouch attachment.

19. The rotating reflective sign for use with a disabled vehicle according to claim 18 wherein the information card is adapted to display information regarding the owner of the vehicle.

20. The rotating reflective sign for use with a disabled vehicle according to claim 19 wherein the information card displays a name, an address, a phone number, or any combination thereof.

* * * * *